US012621232B2

(12) United States Patent (10) Patent No.: US 12,621,232 B2
Giagnocavo et al. (45) Date of Patent: May 5, 2026

(54) VARIABLE LATENCY TESTING

(71) Applicant: CenturyLink Intellectual Property LLC, Denver, CO (US)

(72) Inventors: Patrick Giagnocavo, Littleton, CO (US); Michael Stillman, Pensacola, FL (US)

(73) Assignee: CenturyLink Intellectual Property LLC, Denver, CO (US)

( * ) Notice: Subject to any disclaimer, the term of this patent is extended or adjusted under 35 U.S.C. 154(b) by 264 days.

(21) Appl. No.: 18/660,348

(22) Filed: May 10, 2024

(65) Prior Publication Data

US 2025/0168098 A1 May 22, 2025

Related U.S. Application Data

(60) Provisional application No. 63/601,021, filed on Nov. 20, 2023.

(51) Int. Cl.
*H04L 43/50* (2022.01)
*H04L 43/0888* (2022.01)
*H04L 43/0894* (2022.01)

(52) U.S. Cl.
CPC .......... *H04L 43/50* (2013.01); *H04L 43/0888* (2013.01); *H04L 43/0894* (2013.01)

(58) Field of Classification Search
CPC . H04L 43/50; H04L 43/0888; H04L 43/0894; H04L 41/0668; H04L 41/122; H04L 41/063; H04L 41/0627; H04L 41/0654; H04L 41/12; H04L 43/0811; H04L 41/046; H04L 41/064; H04L 41/0645; H04L 41/065; H04L 41/0659; H04L 41/14; H04L 41/16; H04L 41/22; H04L 43/06; H04L 43/20; H04W 24/04
See application file for complete search history.

(56) References Cited

U.S. PATENT DOCUMENTS

| | | | | |
|---|---|---|---|---|
| 2018/0331946 A1 * | 11/2018 | Olofsson | ................. | H04L 45/22 |
| 2023/0053044 A1 * | 2/2023 | Wang | ................... | H04W 24/04 |
| 2024/0223489 A1 * | 7/2024 | Wu | ...................... | H04L 43/106 |
| 2024/0291706 A1 * | 8/2024 | Jea | ......................... | H04L 41/122 |
| 2024/0305553 A1 * | 9/2024 | Vasseur | ................... | H04L 43/10 |
| 2025/0217259 A1 * | 7/2025 | Wu | ..................... | H04L 41/5067 |

* cited by examiner

*Primary Examiner* — Rushil P. Sampat

(57) ABSTRACT

Novel tools and techniques are provided for implementing variable latency testing. In various embodiments, a computing system may identify a plurality of network devices among network devices that are distributed across a network, based on a set of characteristics for testing a target device in the network. The computing system establishes a plurality of paths, each path corresponding to a path between the target device and one of the plurality of network devices. The plurality of paths includes at least one path having a latency that is different from a latency of other paths and/or at least one path having a connection speed or bandwidth that is different from a connection speed or bandwidth of other paths. The computing system initiates network tests along each established path, analyzes results of the network tests, and presents at least one of the results of the network tests or analyses of the results.

20 Claims, 5 Drawing Sheets

200

300

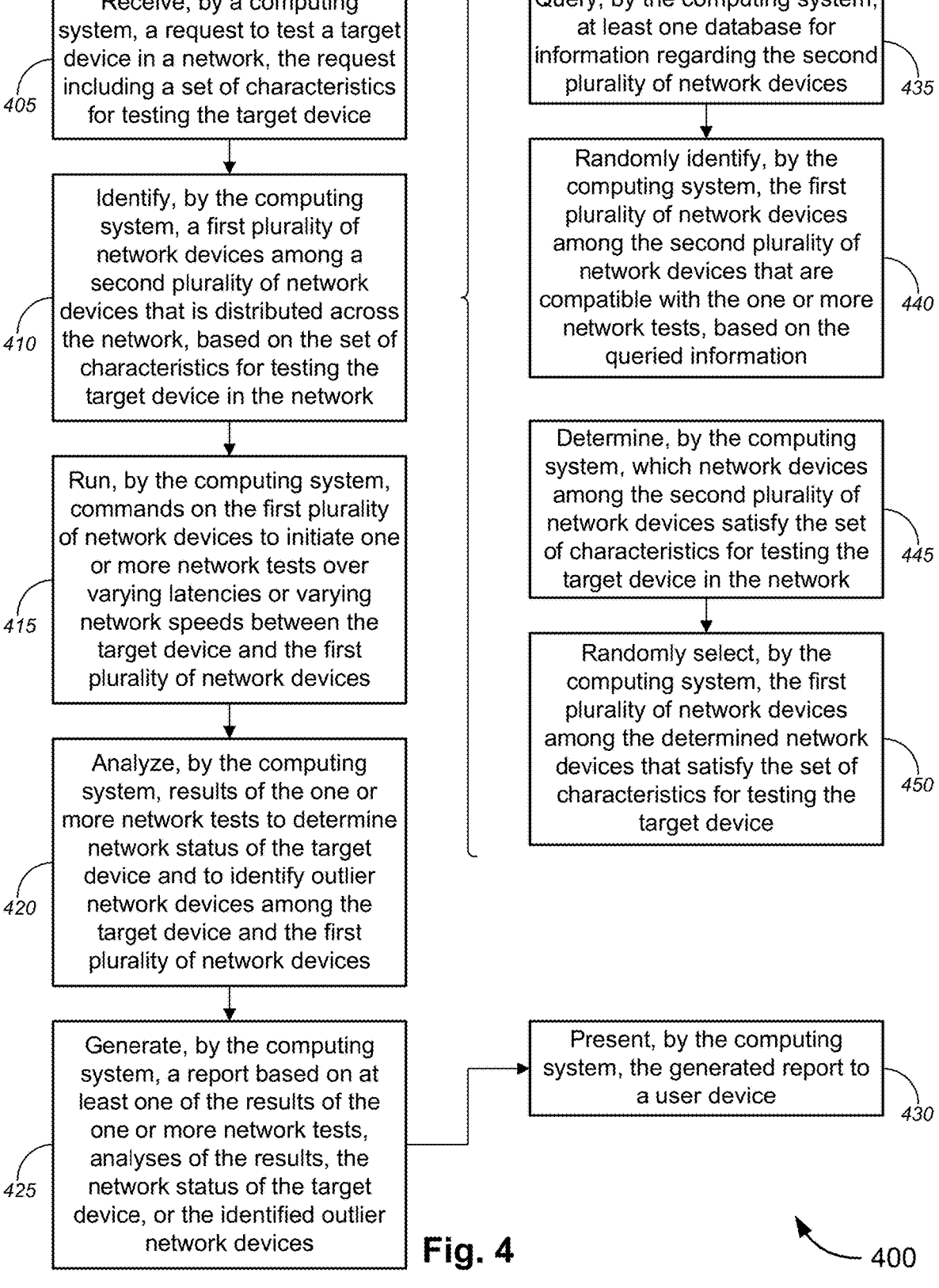

Receive, by a computing system, a request to test a target device in a network, the request including a set of characteristics for testing the target device

405

Identify, by the computing system, a first plurality of network devices among a second plurality of network devices that is distributed across the network, based on the set of characteristics for testing the target device in the network

410

Run, by the computing system, commands on the first plurality of network devices to initiate one or more network tests over varying latencies or varying network speeds between the target device and the first plurality of network devices

415

Analyze, by the computing system, results of the one or more network tests to determine network status of the target device and to identify outlier network devices among the target device and the first plurality of network devices

420

Generate, by the computing system, a report based on at least one of the results of the one or more network tests, analyses of the results, the network status of the target device, or the identified outlier network devices

425

Query, by the computing system, at least one database for information regarding the second plurality of network devices

435

Randomly identify, by the computing system, the first plurality of network devices among the second plurality of network devices that are compatible with the one or more network tests, based on the queried information

440

Determine, by the computing system, which network devices among the second plurality of network devices satisfy the set of characteristics for testing the target device in the network

445

Randomly select, by the computing system, the first plurality of network devices among the determined network devices that satisfy the set of characteristics for testing the target device

450

Present, by the computing system, the generated report to a user device

VARIABLE LATENCY TESTING

CROSS-REFERENCE TO RELATED APPLICATIONS

This application claims the benefit of U.S. Provisional Application No. 63/601,021 filed Nov. 20, 2023, entitled "Variable Latency Testing," which is incorporated herein by reference in its entirety.

COPYRIGHT STATEMENT

FIELD

The present disclosure relates, in general, to methods, systems, and apparatuses for implementing network monitoring and testing, and, more particularly, to methods, systems, and apparatuses for implementing variable latency testing.

BACKGROUND

Traditionally, network testing conditions are controlled, homogenized, predictable, known, and/or in a single data center. Different generations of hardware and applications across multiple different data centers, however, make such traditional testing conditions impractical and unrealistic. It is with respect to this general technical environment to which aspects of the present disclosure are directed.

BRIEF DESCRIPTION OF THE DRAWINGS

A further understanding of the nature and advantages of particular embodiments may be realized by reference to the remaining portions of the specification and the drawings, which are incorporated in and constitute a part of this disclosure.

FIG. 4 depicts a flow diagram illustrating another example method for implementing variable latency testing, in accordance with various embodiments.

DETAILED DESCRIPTION OF CERTAIN EMBODIMENTS

Overview

Figure 1:
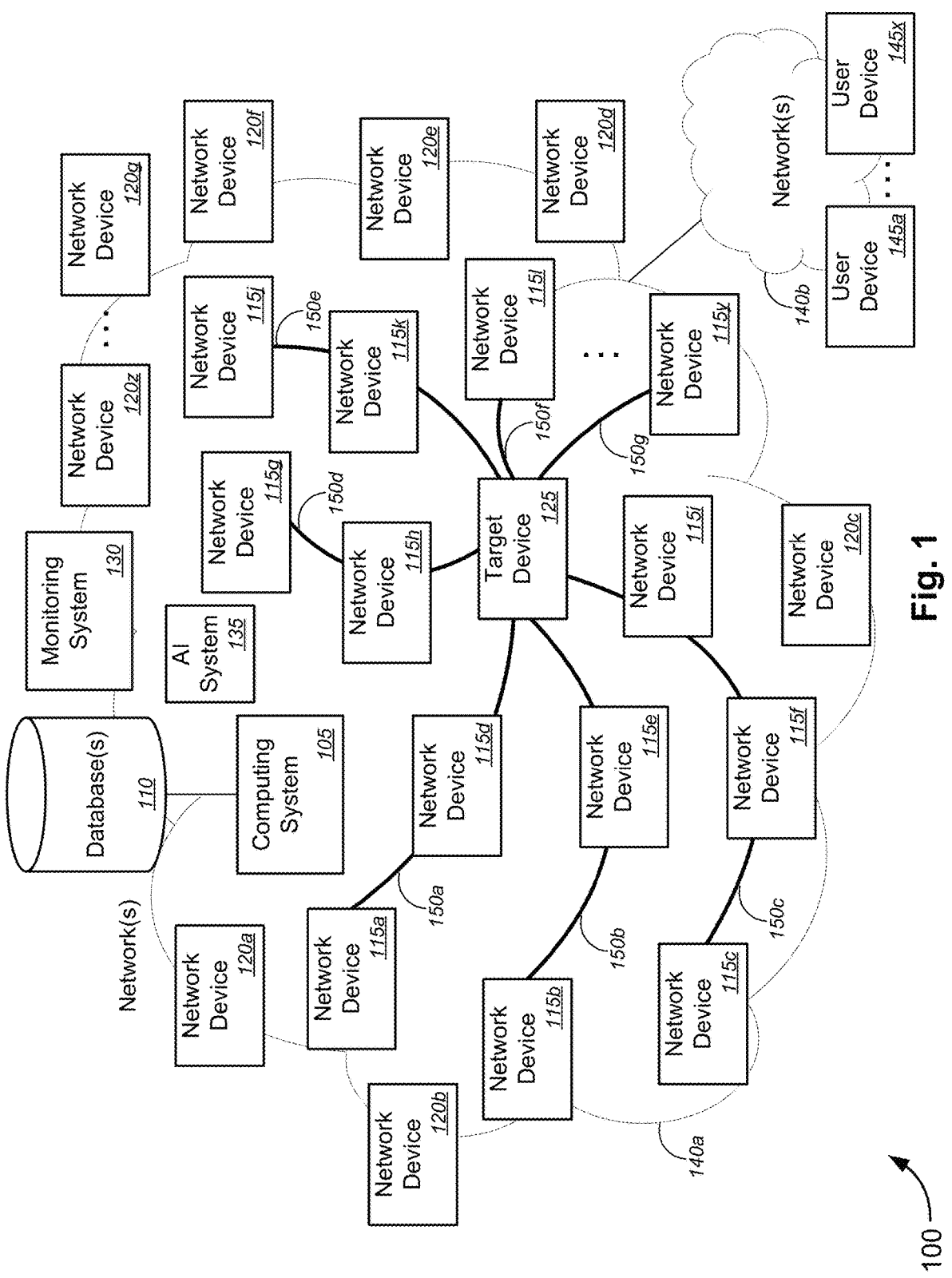
FIG. 1 depicts an example system for implementing variable latency testing, in accordance with various embodiments.

Various embodiments provide tools and techniques for implementing network monitoring and testing, and, more particularly, to methods, systems, and apparatuses for implementing variable latency testing.

In various embodiments, a computing system may identify a first plurality of network devices among a second plurality of network devices that is distributed across a network(s), based on a set of characteristics for testing a target device in the network(s). The computing system establishes a plurality of paths, each path corresponding to a path between the target device and one of the first plurality of network devices. The plurality of paths includes one or more of at least one path having a latency that is different from a latency of other paths among the plurality of paths or at least one path having a connection speed or bandwidth that is different from a connection speed or bandwidth of other paths among the plurality of paths. The computing system initiates one or more network tests along each established path among the plurality of paths, analyzes results of the one or more network tests, and presents at least one of the results of the one or more network tests or analyses of the results to the requesting user device.

In some examples, identifying the first plurality of network devices includes determining which network devices among the second plurality of network devices satisfy the set of characteristics for testing the target device in the network; and randomly selecting the first plurality of network devices among the determined network devices that satisfy the set of characteristics for testing the target device. In some cases, the set of characteristics includes at least one of previously measured latency, public or private network type, interface speed, interface type, customer information, or type of network traffic, and/or the like.

In examples, controlled or pruned stochastic methods may be provided for continuous or intermittent testing and monitoring of a large variable-latency network with diverse ingress and egress points. In some cases, controlled processes take the random nature of the behavior of a system into account. In such cases, it is natural, when choosing a control strategy, to proceed from the average expected result, taking note of all the possible variants of the behavior of a controlled system. Stochastic pruning is an automatic, straightforward level-of-detail method that can greatly reduce the geometric complexity of objects with large numbers of simple, disconnected elements. In some examples, a method and system are provided that automates statistics and performance measurement of any point of the network from multiple ingress and egress points. This method and system allows for distributed testing of a desired point in the network, by having different devices across the network, which are connected in different ways, be used to test/characterize/prove out that point. Devices that do the testing are not dedicated devices but instead are service-provided-managed devices of any applicable kind. Testing across many different network links allows for better testing coverage. Devices, in some examples, are chosen at random but in a controlled fashion, subject to a desired set of characteristics which not all devices will satisfy for a given test.

Unlike conventional network testing techniques whose testing conditions are controlled, homogenized, predictable, known, and/or in a single data center, the various embodiments utilize distributed, diverse links that do not look at only a single datacenter with known speeds and expected latencies or other known network characteristics.

These and other aspects of the variable latency testing are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this detailed description, wherever possible, the same reference numbers are used in the drawing and the detailed description to refer to the same or similar elements. In some instances, a sub-label is associated with a reference numeral to denote one of multiple similar components. When reference is made to a reference numeral without specification an existing sub-label, it is intended to refer to all such multiple similar components. In some cases, for denoting a plurality of components, the suffixes "a" through "n" may be used, where n denotes any suitable non-negative integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 $X05a$-$X05n$, the integer value of n in $X05n$ may be the same or different from the integer value of n in $X10n$ for component #2 $X10a$-$X10n$, and so on. In other cases, other suffixes (e.g., s, t, u, v, w, x, y, and/or z) may similarly denote non-negative integer numbers that (together with n or other like suffixes) may be either all the same as each other, all different from each other, or some combination of same and different (e.g., one set of two or more having the same values with the others having different values, a plurality of sets of two or more having the same value with the others having different values, etc.).

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

Aspects of the present invention, for example, are described below with reference to block diagrams and/or operational illustrations of methods, systems, and computer program products according to aspects of the invention. The functions and/or acts noted in the blocks may occur out of the order as shown in any flowchart. For example, two blocks shown in succession may in fact be executed substantially concurrently or the blocks may sometimes be executed in the reverse order, depending upon the functionalities and/or acts involved. Further, as used herein and in the claims, the phrase "at least one of element A, element B, or element C" (or any suitable number of elements) is intended to convey any of: element A, element B, element C, elements A and B, elements A and C, elements B and C, and/or elements A, B, and C (and so on).

The description and illustration of one or more aspects provided in this application are not intended to limit or restrict the scope of the invention as claimed in any way. The aspects, examples, and details provided in this application are considered sufficient to convey possession and enable others to make and use the best mode of the claimed invention. The claimed invention should not be construed as being limited to any aspect, example, or detail provided in this application. Regardless of whether shown and described in combination or separately, the various features (both structural and methodological) are intended to be selectively rearranged, included, or omitted to produce an example or embodiment with a particular set of features. Having been provided with the description and illustration of the present application, one skilled in the art may envision variations, modifications, and alternate aspects, examples, and/or similar embodiments falling within the spirit of the broader aspects of the general inventive concept embodied in this application that do not depart from the broader scope of the claimed invention.

In an aspect, the technology relates to a method, including identifying, by a computing system, a first plurality of network devices among a second plurality of network devices that is distributed across a network, based on a set of characteristics for testing a target device in the network. The method further includes establishing, by the computing system, a first plurality of paths, each path corresponding to a path between the target device and one of the first plurality of network devices. The first plurality of paths includes one or more of at least one second path having a latency that is different from a latency of other paths among the first plurality of paths or at least one third path having a connection speed or bandwidth that is different from a connection speed or bandwidth of other paths among the first plurality of paths. The method further includes initiating, by the computing system, one or more network tests along each established path among the first plurality of paths; analyzing, by the computing system, results of the one or more network tests; and presenting, by the computing system, at least one of the results of the one or more network tests or analyses of the results.

In some examples, the computing system includes at least one of an application-specific integrated circuit ("ASIC"), a network testing system, a system orchestrator, a server, a cloud computing system, or a distributed computing system, and/or the like. In some instances, the first plurality of network devices includes at least one of one or more customer premises equipment ("CPEs"), one or more routers, one or more firewalls, one or more cloud servers, or one or more other network equipment, and/or the like. In some cases, the set of characteristics includes at least one of previously measured latency, public or private network type, interface speed, interface type, customer information, or type of network traffic, and/or the like. In examples, the one or more network tests include at least one of initiating border gateway protocol ("BGP") queries, initiating traceroute functions, initiating a network ping, performing a domain name system ("DNS") queries, performing bandwidth testing, performing network connection testing, performing quality of service ("QOS") testing, performing class of service ("COS") testing, performing latency testing, performing bandwidth testing, performing virtual private network ("VPN") testing, or performing hypertext transfer protocol ("HTTP") testing, and/or the like.

In examples, the method further includes, based on the analysis, determining, by the computing system, whether the target device is on the network yet unreachable by one or more parts of the network or by one or more ports on an external network interface. In some examples, identifying the first plurality of network devices includes querying, by the computing system, at least one database for information regarding the second plurality of network devices; and identifying, by the computing system, the first plurality of network devices among the second plurality of network devices that are compatible with the one or more network tests, based on the queried information. Alternatively or additionally, identifying the first plurality of network devices includes determining, by the computing system, which network devices among the second plurality of network devices satisfy the set of characteristics for testing the target device in the network; and randomly selecting, by the computing system, the first plurality of network devices among the determined network devices that satisfy the set of characteristics for testing the target device.

In another aspect, the technology relates to a system, including a computing system. The computing system includes at least one first processor; and a first non-transitory computer readable medium communicatively coupled to the at least one first processor. The first non-transitory computer readable medium has stored thereon computer software including a first set of instructions that, when executed by the at least one first processor, causes the computing system to: receive a request to test a target device; identify a first plurality of network devices among a second plurality of network devices that is distributed across a network, based on a set of characteristics for testing a target device in the network; establish a first plurality of paths, each path corresponding to a path between the target device and one of the first plurality of network devices, the first plurality of paths including one or more of at least one second path having a latency that is different from a latency of other paths among the first plurality of paths or at least one third path having a connection speed or bandwidth that is different from a connection speed or bandwidth of other paths among the first plurality of paths; initiate one or more network tests along each established path among the first plurality of paths; analyze results of the one or more network tests; and present at least one of the results of the one or more network tests or analyses of the results.

In examples, the computing system includes at least one of an ASIC, a network testing system, a system orchestrator, a server, a cloud computing system, or a distributed computing system, and/or the like. In some instances, the first plurality of network devices includes at least one of one or more CPEs, one or more routers, one or more firewalls, one or more cloud servers, or one or more other network equipment, and/or the like. In some cases, the set of characteristics includes at least one of previously measured latency, public or private network type, interface speed, interface type, customer information, or type of network traffic, and/or the like. In some examples, the one or more network tests include at least one of initiating BGP queries, initiating traceroute functions, initiating a network ping, performing a DNS queries, performing bandwidth testing, performing network connection testing, performing QOS testing, performing COS testing, performing latency testing, performing bandwidth testing, performing VPN testing, or performing HTTP testing, and/or the like.

In some examples, the first set of instructions, when executed by the at least one first processor, further causes the computing system to, based on the analysis, determining, by the computing system, whether the target device is on the network yet unreachable by one or more parts of the network or by one or more ports on an external network interface. In examples, identifying the first plurality of network devices includes querying, by the computing system, at least one database for information regarding the second plurality of network devices; and identifying, by the computing system, the first plurality of network devices among the second plurality of network devices that are compatible with the one or more network tests, based on the queried information.

In yet another aspect, the technology relates to a method, including receiving, by a computing system, a request to test a target device in a network, the request including a set of characteristics for testing the target device; and identifying, by the computing system, a first plurality of network devices among a second plurality of network devices that is distributed across the network, based on the set of characteristics for testing the target device in the network. The method further includes running, by the computing system, commands on the first plurality of network devices to initiate one or more network tests over varying latencies or varying network speeds between the target device and the first plurality of network devices. The method further includes analyzing, by the computing system, results of the one or more network tests to determine network status of the target device and to identify outlier network devices among the target device and the first plurality of network devices, based on at least one of the determined network status of the target device or the results of the one or more network tests. The method further includes generating, by the computing system, a report based on at least one of the results of the one or more network tests, analyses of the results, the network status of the target device, or the identified outlier network devices; and presenting, by the computing system, the generated report to a user device.

In some examples, the first plurality of network devices includes at least one of one or more CPEs, one or more routers, one or more firewalls, one or more cloud servers, or one or more other network equipment, and/or the like. In some instances, the set of characteristics includes at least one of previously measured latency, public or private network type, interface speed, interface type, customer information, or type of network traffic, and/or the like. In some cases, the one or more network tests include at least one of initiating BGP queries, initiating traceroute functions, initiating a network ping, performing a DNS queries, performing bandwidth testing, performing network connection testing, performing QOS testing, performing COS testing, performing latency testing, performing bandwidth testing, performing VPN testing, or performing HTTP testing, and/or the like.

In examples, identifying the first plurality of network devices includes querying, by the computing system, at least one database for information regarding the second plurality of network devices; and randomly identifying, by the computing system, the first plurality of network devices among the second plurality of network devices that are compatible with the one or more network tests, based on the queried information.

Various modifications and additions can be made to the embodiments discussed without departing from the scope of the invention. For example, while the embodiments described above refer to particular features, the scope of this invention also includes embodiments having different combination of features and embodiments that do not include all of the above-described features.

Specific Exemplary Embodiments

We now turn to the embodiments as illustrated by the drawings. FIGS. 1-5 illustrate some of the features of the method, system, and apparatus for implementing network monitoring and testing, and, more particularly, to methods, systems, and apparatuses for implementing variable latency testing, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

With reference to the figures, FIG. 1 depicts an example system 100 for implementing variable latency testing, in accordance with various embodiments. In the non-limiting example of FIG. 1, system 100 includes computing system 105 and corresponding database(s) 110, one or more network devices 115a-115y and 120a-120z (collectively, "network devices 115 and 120" or the like), target device 125, monitoring system 130, artificial intelligence ("AI") system 135, each disposed in network(s) 140a. System 100 further includes one or more user devices 145a-145x (collectively, "user devices 145" or the like) disposed in network(s) 140b. Herein, x, y, and z are non-negative integer numbers that may be either all the same as each other, all different from each other, or some combination of same and different (e.g., one set of two or more having the same values with the others having different values, a plurality of sets of two or more having the same value with the others having different values, etc.).

In some examples, the computing system 105 includes at least one of an application-specific integrated circuit ("ASIC"), a network testing system, a system orchestrator, a server, a cloud computing system, or a distributed computing system, and/or the like. In some instances, the network devices 115 and 120 includes at least one of one or more customer premises equipment ("CPEs"), one or more routers, one or more firewalls, one or more cloud servers, or one or more other network equipment, and/or the like. The target device 125 is one of the network devices 115 or 120. In some cases, the monitoring system 130 is configured to monitor and test network devices and target devices using one or more network tests. In examples, the one or more network tests include at least one of initiating border gateway protocol ("BGP") queries, initiating traceroute functions, initiating a network ping, performing a domain name system ("DNS") queries, performing bandwidth testing, performing network connection testing, performing quality of service ("QOS") testing, performing class of service ("COS") testing, performing latency testing, performing bandwidth testing, performing virtual private network ("VPN") testing, or performing hypertext transfer protocol ("HTTP") testing, and/or the like.

In some instances, the one or more user devices 145a-145x may each include, but is not limited to, one of a desktop computer, a laptop computer, a tablet computer, a smart phone, a mobile phone, a network operations center ("NOC") computing system or console, and/or the like. In examples, the user devices 145 may be associated with corresponding users each including, without limitation, one of an individual, a group of individuals, a private company, a group of private companies, a public company, a group of public companies, an institution, a group of institutions, an association, a group of associations, a governmental agency, a group of governmental agencies, or any suitable entity or their agent(s), representative(s), owner(s), and/or stakeholder(s), or the like. In some cases, customer premises at which the CPEs may be located may include, but is not limited to, one of a residential customer premises, a business customer premises, a corporate customer premises, an enterprise customer premises, an education facility customer premises, a medical facility customer premises, or a governmental customer premises, and/or the like.

According to some embodiments, networks 140a and 140b may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a VPN; the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the networks 140a and 140b may include an access network of the service provider (e.g., an Internet service provider ("ISP")). In another embodiment, the networks 140a and 140b may include a core network of the service provider and/or the Internet.

Figure 2:
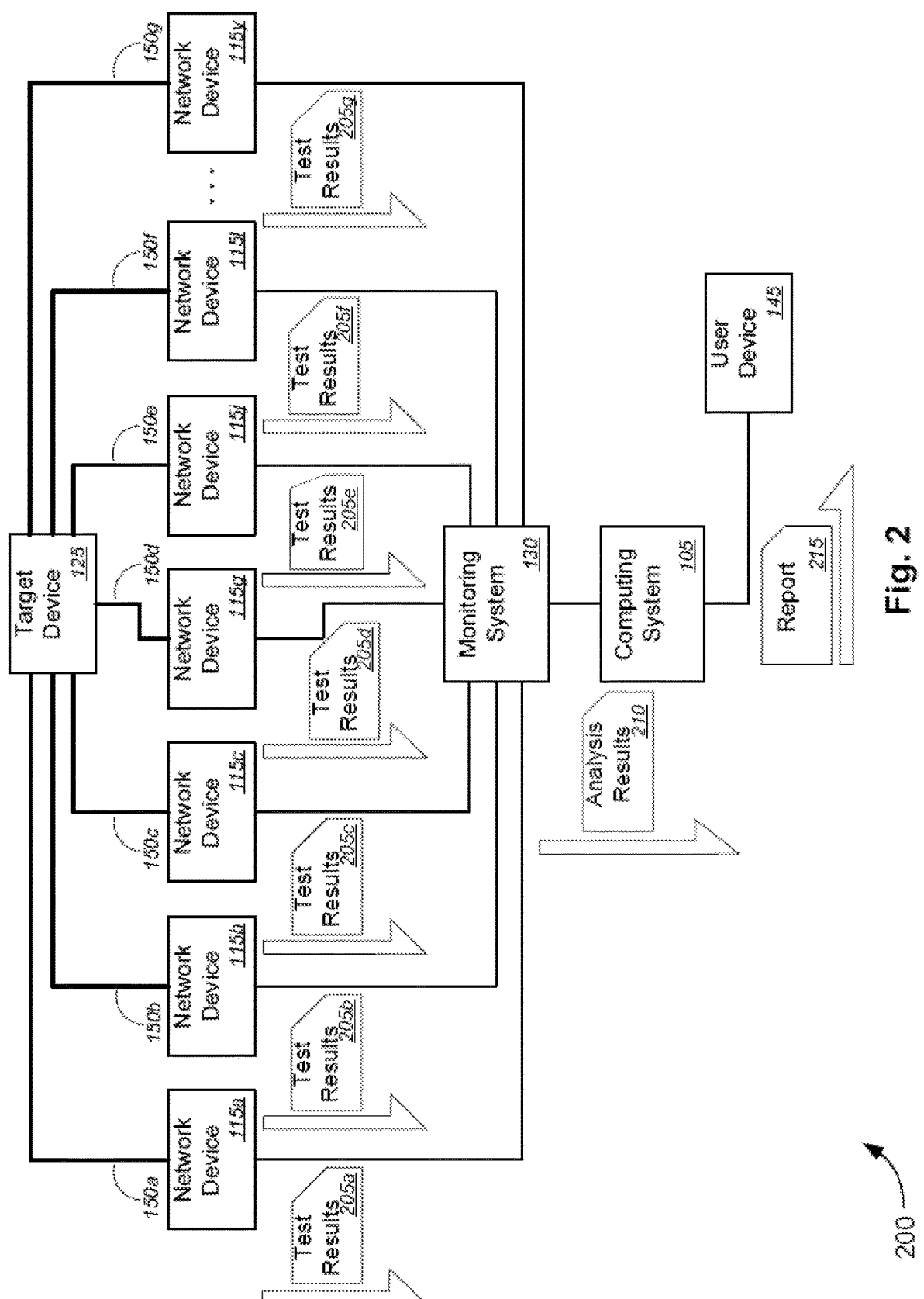
FIG. 2 depicts an example sequence flow for implementing variable latency testing, in accordance with various embodiments.
Figure 3:
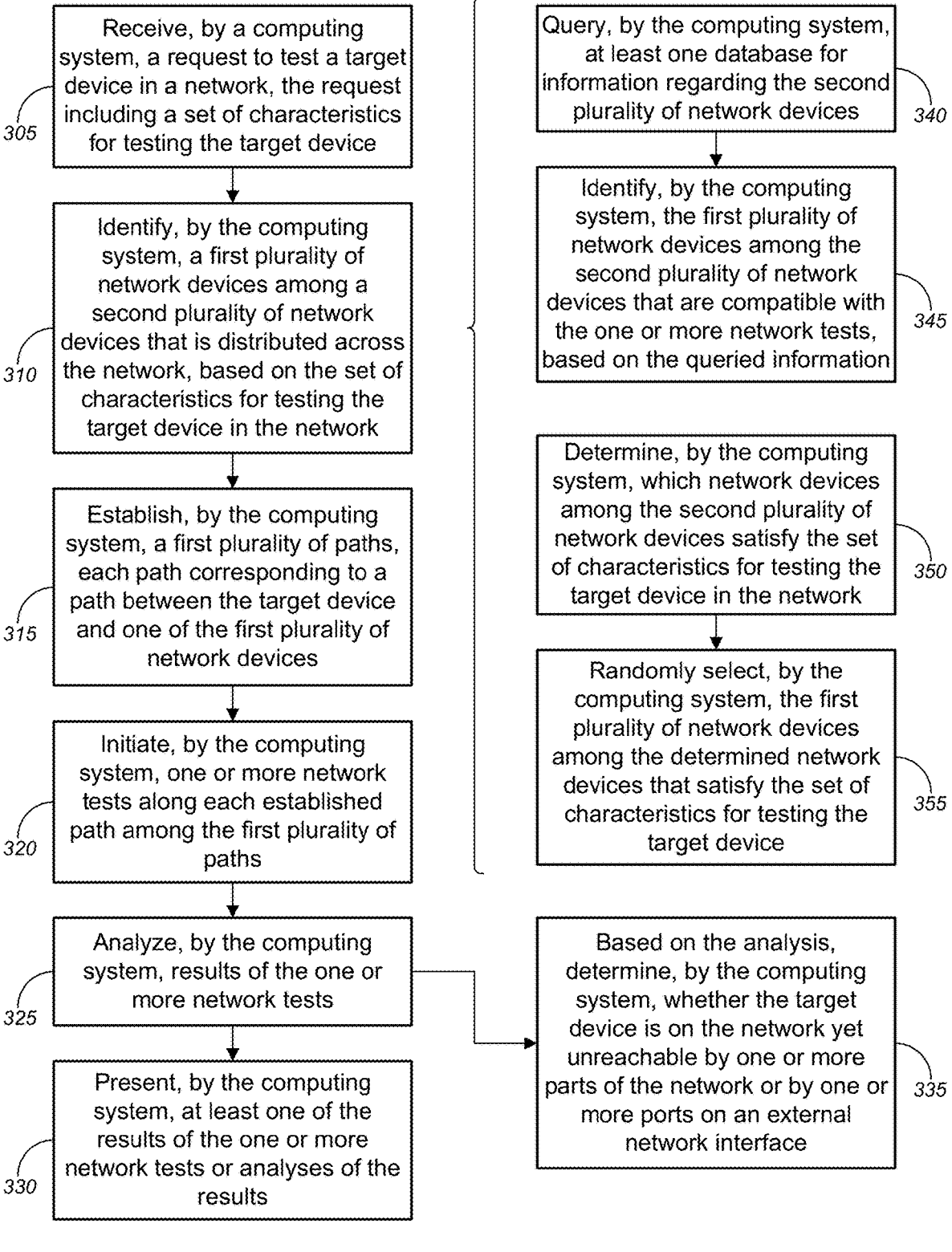
FIG. 3 depicts a flow diagram illustrating an example method for implementing variable latency testing, in accordance with various embodiments.

In operation, the computing system 105 may perform methods for implementing variable latency testing, as described in detail with respect to FIGS. 2-4. For example, sequence flows as described below with respect to FIG. 2, example methods 300 and 400 as shown with respect to FIGS. 3 and 4, respectively, may be applied with respect to the operations of example system 100 of FIG. 1.

In some aspects, in response to receiving, from a user device 145, a request to test a target device (e.g., target device 125, or the like), the computing system 105 may query at least one database for information regarding a plurality of network devices including network devices 115a-115y and 120a-120z, to identify a first plurality of network devices 115a-115y among the plurality of network devices that is distributed across the network(s) 140a, based on a set of characteristics for testing the target device 125 in the network(s) 140a. In some examples, identifying the first plurality of network devices 115a-115y includes determining which network devices among the second plurality of network devices satisfy the set of characteristics for testing the target device in the network; and randomly selecting the first plurality of network devices 115 among the determined network devices that satisfy the set of characteristics for testing the target device 125. In some cases, the set of characteristics includes at least one of previously measured latency, public or private network type, interface speed, interface type, customer information, or type of network traffic, and/or the like. In examples, the computing system 105 establishes a plurality of paths 150a-150g (collectively, "paths 150" or the like), each path 150 corresponding to a path between the target device 125 and one of the first plurality of network devices 115, the plurality of paths including one or more of at least one path having a latency that is different from a latency of other paths among the plurality of paths 150 or at least one path having a connection speed or bandwidth that is different from a connection speed or bandwidth of other paths among the plurality of paths 150. The computing system 105, the monitoring system 130, and/or the AI system 135 initiates one or more network tests along each established path among the plurality of paths 150. The computing system 105, the monitoring system 130, and/or the AI system 135 analyzes results of the one or more network tests, and presents at least one of the results of the one or more network tests or analyses of the results to the requesting user device 145.

In other aspects, alternative or additional to establishing the paths, the computing system 105, the monitoring system 130, and/or the AI system 135 runs commands on the first plurality of network devices 115a-115y to initiate the one or more network tests over varying latencies or varying network speeds between the target device 125 and the first plurality of network devices 115a-115y. The computing system 105, the monitoring system 130, and/or the AI system 135 analyzes results of the one or more network tests to determine network status of the target device and to identify outlier network devices among the target device and the first plurality of network devices, based on at least one of the determined network status of the target device or the results of the one or more network tests. The computing system 105, the monitoring system 130, and/or the AI system 135 then generates a report based on at least one of the results of the one or more network tests, analyses of the results, the network status of the target device, or the identified outlier network devices; and presents the generated report to a user device.

FIG. 2 depicts an example sequence flow 200 for implementing variable latency testing, in accordance with various embodiments. In some embodiments, computing system 105, network devices 115a-115y, target device 125, monitoring system 130, user device 145, and paths 150a-150g of FIG. 2 may be similar, if not identical, to the computing system 105, network devices 115a-115y, target device 125, monitoring system 130, user devices 145a-145x, and paths 150a-150g, respectively, of system 100 of FIG. 1, and the description of these components of system 100 of FIG. 1 are similarly applicable to the corresponding components of FIG. 2.

With reference to FIG. 2, after paths 150a-150g have been established each between the target device 125 and one of the selected network devices (e.g., network devices 115a, 115b, 115c, 115g, 115j, 115l, and 115y, etc.), and one or more network tests have been initiated, corresponding test results 205a-205g may be monitored or collected by monitoring system 130. As described above, the one or more network tests include at least one of initiating BGP queries, initiating traceroute functions, initiating a network ping, performing a DNS queries, performing bandwidth testing, performing network connection testing, performing QOS testing, performing COS testing, performing latency testing, performing bandwidth testing, performing VPN testing, or performing HTTP testing, and/or the like. In examples, analysis results 210 may be provided by the monitoring system 130 to the computing system 105, which may generate a report 215 based on at last one of the test results 205a-205g and/or analysis results 210. The computing system may then send the generated report 215 to user device 145.

In some aspects, the various embodiments can be used to prove the negative case where a device is on a network but is not reachable by certain parts of a network or ports on the external network interface (e.g., simplified pen-testing, provable filtering, etc.). In some examples, where device on the network is not reachable, the system may determine whether a firewall device is going to stop traffic, and may test from different ranges of IP addresses. If the firewall device blocks all, then it is determined to be in working order. If not, then it is determined that a problem has occurred.

In some embodiments, ASICs may be used on core routers, and performance could vary based on characteristics. In some examples, one device or network block (however defined) is chosen as the target device to measure, quantify, and/or test. In examples, the system may use weights or memory (or previously seen behavior), plus randomness to choose which of many devices (e.g., CPEs or other network devices) to use. In some instances, edge-weighting may also be based on various inputs, such as public/private statuses, etc., or previously measured latency, or other weights include interface speed, type (e.g., SONET, SDH, Ethernet, T1, satellite, etc.), customer information, type of traffic, etc.

In some examples, the system may further compute satisfiability, to determine that the nodes selected to participate in the testing are capable of achieving all the points of desired network testing. In some instances, the system may be provided with an ability to modify differentiated services code point ("DSCP") values for testing QOS/COS. As used herein, DSCP may refer to a technique for classifying and managing network traffic and of providing QoS in layer 3 Internet Protocol ("IP") networks. Additional tests may include BGP queries that queries BGP status (e.g., idle, connect, active, open sent, open confirm, established, etc.), traceroute queries that query routes or paths in the network, DNS queries that query domain name systems, (limited) bandwidth testing, etc.

In some aspects, network characteristics and/or constraints can include tests from particular geographical locations. A database may already contain information on connections between devices in the network. In a process, a user may log in, and may enter constraints or characteristics. The system may look up all the devices that satisfy constraints from a database. If more devices are found than required, the system can choose randomly or consider other weights or constraints. In examples, constraints can indicate how many devices (which number can have a default value). The system can choose the network devices to test, and can connect to chosen devices. In some embodiments, the system can use password methods or other authentication techniques. The system can also use run commands including Show, Ping, See if BGP community is on the list (private BGP community; see if one can reach the others (e.g., 20 different locations)), Read some kind of value, etc. Different variables correspond to each device (with sufficient number of routes to cover different variables). The system can look at data and look for outliers (based constraints). In examples, traditional statistical methods, e.g., Holt-Winters anomaly detection "Triple Exponential Smoothing" may be used. In some examples, AI system may also be used. For instance, for constraints of 100 ms±20 ms, the system may identify 19 network devices and one 300 ms outlier device. Once an outlier device has been identified, a report may be generated indicating that the network devices worked up to 10 MB, and the report can be used as input to other processes (e.g., system maintenance and/or repair, further network and/or service provisioning, etc.)

FIG. 3 depicts a flow diagram illustrating an example method 300 for implementing variable latency testing, in accordance with various embodiments.

In the non-limiting embodiment of FIG. 3, method 300, at operation 305, includes receiving, by a computing system, a request to test a target device in a network, the request including a set of characteristics for testing the target device. At operation 310, method 300 includes identifying, by the computing system, a first plurality of network devices among a second plurality of network devices that is distributed across the network, based on the set of characteristics for testing the target device in the network. In examples, the computing system includes at least one of an ASIC, a network testing system, a system orchestrator, a server, a cloud computing system, or a distributed computing system, and/or the like. In some instances, the first plurality of network devices includes at least one of one or more CPEs, one or more routers, one or more firewalls, one or more cloud servers, or one or more other network equipment, and/or the like.

Method 300 further includes, at operation 315, establishing, by the computing system, a first plurality of paths, each path corresponding to a path between the target device and one of the first plurality of network devices. The first plurality of paths includes one or more of at least one second path having a latency that is different from a latency of other paths among the first plurality of paths or at least one third path having a connection speed or bandwidth that is different from a connection speed or bandwidth of other paths among the first plurality of paths. Method 300 further includes initiating, by the computing system, one or more network tests along each established path among the first plurality of paths (at operation 320).

In some cases, the set of characteristics includes at least one of previously measured latency, public or private network type, interface speed, interface type, customer information, or type of network traffic, and/or the like. In some examples, the one or more network tests include at least one of initiating BGP queries, initiating traceroute functions, initiating a network ping, performing a DNS queries, performing bandwidth testing, performing network connection testing, performing QOS testing, performing COS testing, performing latency testing, performing bandwidth testing, performing VPN testing, or performing HTTP testing, and/or the like.

At operation 325, method 300 includes analyzing, by the computing system, results of the one or more network tests. Method 300 further includes, at operation 330, presenting, by the computing system, at least one of the results of the one or more network tests or analyses of the results. In some examples, method 300 further includes, based on the analysis, determining, by the computing system, whether the target device is on the network yet unreachable by one or more parts of the network or by one or more ports on an external network interface (at operation 335).

In some examples, identifying the first plurality of network devices (at operation 310) includes querying, by the computing system, at least one database for information regarding the second plurality of network devices (at operation 340); and identifying, by the computing system, the first plurality of network devices among the second plurality of network devices that are compatible with the one or more network tests, based on the queried information (at operation 345). Alternatively or additionally, identifying the first plurality of network devices (at operation 310) includes determining, by the computing system, which network devices among the second plurality of network devices satisfy the set of characteristics for testing the target device in the network (at operation 350); and randomly selecting, by the computing system, the first plurality of network devices among the determined network devices that satisfy the set of characteristics for testing the target device (at operation 355).

FIG. 4 depicts a flow diagram illustrating another example method 400 for implementing variable latency testing, in accordance with various embodiments.

In the non-limiting embodiment of FIG. 4, method 400, at operation 405, may include receiving, by a computing system, a request to test a target device in a network, the request including a set of characteristics for testing the target device. At operation 410, method 400 includes identifying, by the computing system, a first plurality of network devices among a second plurality of network devices that is distributed across the network, based on the set of characteristics for testing the target device in the network. In examples, the computing system includes at least one of an ASIC, a network testing system, a system orchestrator, a server, a cloud computing system, or a distributed computing system, and/or the like. In some instances, the first plurality of network devices includes at least one of one or more CPEs, one or more routers, one or more firewalls, one or more cloud servers, or one or more other network equipment, and/or the like.

Method 400 further includes, at operation 415, running, by the computing system, commands on the first plurality of network devices to initiate one or more network tests over varying latencies or varying network speeds between the target device and the first plurality of network devices. At operation 420, method 400 further includes analyzing, by the computing system, results of the one or more network tests to determine network status of the target device and to identify outlier network devices among the target device and the first plurality of network devices, based on at least one of the determined network status of the target device or the results of the one or more network tests.

In some cases, the set of characteristics includes at least one of previously measured latency, public or private network type, interface speed, interface type, customer information, or type of network traffic, and/or the like. In some examples, the one or more network tests include at least one of initiating BGP queries, initiating traceroute functions, initiating a network ping, performing a DNS queries, performing bandwidth testing, performing network connection testing, performing QOS testing, performing COS testing, performing latency testing, performing bandwidth testing, performing VPN testing, or performing HTTP testing, and/or the like.

Method 400 further includes generating, by the computing system, a report based on at least one of the results of the one or more network tests, analyses of the results, the network status of the target device, or the identified outlier network devices, and/or the like (at operation 425). At operation 430, method 400 further includes presenting, by the computing system, the generated report to a user device.

In some examples, identifying the first plurality of network devices (at operation 410) includes querying, by the computing system, at least one database for information regarding the second plurality of network devices (at operation 435); and randomly identifying, by the computing system, the first plurality of network devices among the second plurality of network devices that are compatible with the one or more network tests, based on the queried information (at operation 440). Alternatively or additionally, identifying the first plurality of network devices (at operation 410) includes determining, by the computing system, which network devices among the second plurality of network devices satisfy the set of characteristics for testing the target device in the network (at operation 445); and randomly selecting, by the computing system, the first plurality of network devices among the determined network devices that satisfy the set of characteristics for testing the target device (at operation 450).

While the techniques and procedures in methods 300, 400 are depicted and/or described in a certain order for purposes of illustration, it should be appreciated that certain procedures may be reordered and/or omitted within the scope of various embodiments. Moreover, while the methods 300, 400 may be implemented by or with (and, in some cases, are described below with respect to) the systems, examples, or embodiments 100 and 200 of FIGS. 1 and 2, respectively (or components thereof), such methods may also be implemented using any suitable hardware (or software) implementation. Similarly, while each of the systems, examples, or embodiments 100 and 200 of FIGS. 1 and 2, respectively (or components thereof), can operate according to the methods 300, 400 (e.g., by executing instructions embodied on a computer readable medium), the systems, examples, or embodiments 100 and 200 of FIGS. 1 and 2 can each also operate according to other modes of operation and/or perform other suitable procedures.

Exemplary System and Hardware Implementation

Figure 5:
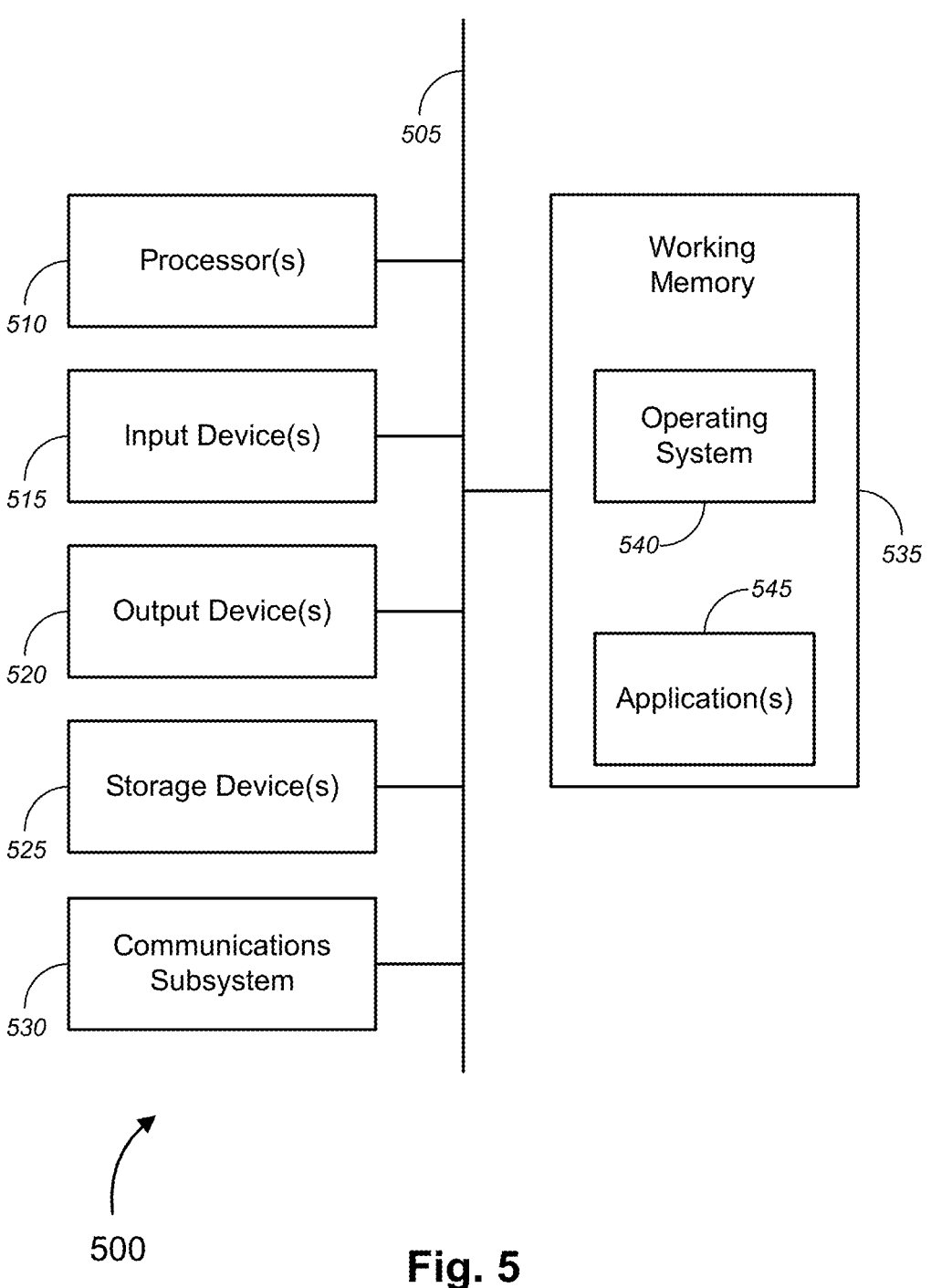
FIG. 5 depicts a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing systems 105, network devices 115a-115y and 120a-120z, target devices 125, monitoring systems 130, AI system 135, and user devices 145a-145x and 145, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing systems 105, network devices 115a-115y and 120a-120z, target devices 125, monitoring systems 130, AI system 135, and user devices 145a-145x and 145, etc.), described above with respect to FIGS. 1-4—is shown including hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can include, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a Wi-Fi device, a WiMAX device, a wireless wide area network ("WWAN") device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further include a working memory 535, which can include a RAM or ROM device, as described above.

The computer or hardware system 500 also may include software elements, shown as being currently located within the working memory 535, including an operating system 540, device drivers, executable libraries, and/or other code, such as one or more application programs 545, which may include computer programs provided by various embodiments (including, without limitation, hypervisors, virtual machines ("VMs"), and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that include the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:

identifying, by a computing system, a first plurality of network devices among a second plurality of network devices that is distributed across a network, based on a set of characteristics for testing a target device in the network;

establishing, by the computing system, a first plurality of paths, each path corresponding to a path between the target device and one of the first plurality of network devices, the first plurality of paths including one or more of at least one second path having a latency that is different from a latency of other paths among the first plurality of paths or at least one third path having a connection speed or bandwidth that is different from a connection speed or bandwidth of other paths among the first plurality of paths;

initiating, by the computing system, one or more network tests along each established path among the first plurality of paths;

analyzing, by the computing system, results of the one or more network tests; and presenting, by the computing system, at least one of the results of the one or more network tests or analyses of the results.

2. The method of claim 1, wherein the computing system comprises at least one of an application-specific integrated circuit ("ASIC"), a network testing system, a system orchestrator, a server, a cloud computing system, or a distributed computing system.

3. The method of claim 1, wherein the first plurality of network devices comprises at least one of one or more customer premises equipment ("CPEs"), one or more routers, one or more firewalls, one or more cloud servers, or one or more other network equipment.

4. The method of claim 1, wherein the set of characteristics comprises at least one of previously measured latency, public or private network type, interface speed, interface type, customer information, or type of network traffic.

5. The method of claim 1, wherein the one or more network tests include at least one of initiating border gateway protocol ("BGP") queries, initiating traceroute functions, initiating a network ping, performing a domain name system ("DNS") queries, performing bandwidth testing, performing network connection testing, performing quality of service ("QOS") testing, performing class of service ("COS") testing, performing latency testing, performing bandwidth testing, performing virtual private network ("VPN") testing, or performing hypertext transfer protocol ("HTTP") testing.

6. The method of claim 1, further comprising:

based on the analysis, determining, by the computing system, whether the target device is on the network yet unreachable by one or more parts of the network or by one or more ports on an external network interface.

7. The method of claim 1, wherein identifying the first plurality of network devices comprises:

querying, by the computing system, at least one database for information regarding the second plurality of network devices; and identifying, by the computing system, the first plurality of network devices among the second plurality of network devices that are compatible with the one or more network tests, based on the queried information.

8. The method of claim 1, wherein identifying the first plurality of network devices comprises:

determining, by the computing system, which network devices among the second plurality of network devices satisfy the set of characteristics for testing the target device in the network; and randomly selecting, by the computing system, the first plurality of network devices among the determined network devices that satisfy the set of characteristics for testing the target device.

9. A system, comprising:

a computing system, comprising:

at least one first processor; and a first non-transitory computer readable medium communicatively coupled to the at least one first processor, the first non-transitory computer readable medium having stored thereon computer software comprising a first set of instructions that, when executed by the at least one first processor, causes the computing system to:

receive a request to test a target device;

identify a first plurality of network devices among a second plurality of network devices that is distributed across a network, based on a set of characteristics for testing a target device in the network;

establish a first plurality of paths, each path corresponding to a path between the target device and one of the first plurality of network devices, the first plurality of paths including one or more of at least one second path having a latency that is different from a latency of other paths among the first plurality of paths or at least one third path having a connection speed or bandwidth that is different from a connection speed or bandwidth of other paths among the first plurality of paths;

initiate one or more network tests along each established path among the first plurality of paths;

analyze results of the one or more network tests; and present at least one of the results of the one or more network tests or analyses of the results.

10. The system of claim 9, wherein the computing system comprises at least one of an application-specific integrated circuit ("ASIC"), a network testing system, a system orchestrator, a server, a cloud computing system, or a distributed computing system.

11. The system of claim 9, wherein the first plurality of network devices comprises at least one of one or more customer premises equipment ("CPEs"), one or more routers, one or more firewalls, one or more cloud servers, or one or more other network equipment.

12. The system of claim 9, wherein the set of characteristics comprises at least one of previously measured latency, public or private network type, interface speed, interface type, customer information, or type of network traffic.

13. The system of claim 9, wherein the one or more network tests include at least one of initiating border gateway protocol ("BGP") queries, initiating traceroute functions, initiating a network ping, performing a domain name system ("DNS") queries, performing bandwidth testing, performing network connection testing, performing quality of service ("QOS") testing, performing class of service ("COS") testing, performing latency testing, performing bandwidth testing, performing virtual private network ("VPN") testing, or performing hypertext transfer protocol ("HTTP") testing.

14. The system of claim 9, wherein the first set of instructions, when executed by the at least one first processor, further causes the computing system to:

based on the analysis, determining, by the computing system, whether the target device is on the network yet unreachable by one or more parts of the network or by one or more ports on an external network interface.

15. The system of claim 9, wherein identifying the first plurality of network devices comprises:

querying, by the computing system, at least one database for information regarding the second plurality of network devices; and identifying, by the computing system, the first plurality of network devices among the second plurality of network devices that are compatible with the one or more network tests, based on the queried information.

16. A method, comprising:

receiving, by a computing system, a request to test a target device in a network, the request including a set of characteristics for testing the target device;

identifying, by the computing system, a first plurality of network devices among a second plurality of network devices that is distributed across the network, based on the set of characteristics for testing the target device in the network;

running, by the computing system, commands on the first plurality of network devices to initiate one or more network tests over varying latencies or varying network speeds between the target device and the first plurality of network devices;

analyzing, by the computing system, results of the one or more network tests to determine network status of the target device and to identify outlier network devices among the target device and the first plurality of network devices, based on at least one of the determined network status of the target device or the results of the one or more network tests;

generating, by the computing system, a report based on at least one of the results of the one or more network tests, analyses of the results, the network status of the target device, or the identified outlier network devices; and presenting, by the computing system, the generated report to a user device.

17. The method of claim 16, wherein the first plurality of network devices comprises at least one of one or more customer premises equipment ("CPEs"), one or more routers, one or more firewalls, one or more cloud servers, or one or more other network equipment.

18. The method of claim 16, wherein the set of characteristics comprises at least one of previously measured latency, public or private network type, interface speed, interface type, customer information, or type of network traffic.

19. The method of claim 16, wherein the one or more network tests include at least one of initiating border gateway protocol ("BGP") queries, initiating traceroute functions, initiating a network ping, performing a domain name system ("DNS") queries, performing bandwidth testing, performing network connection testing, performing quality of service ("QOS") testing, performing class of service ("COS") testing, performing latency testing, performing bandwidth testing, performing virtual private network ("VPN") testing, or performing hypertext transfer protocol ("HTTP") testing.

20. The method of claim 16, wherein identifying the first plurality of network devices comprises:

querying, by the computing system, at least one database for information regarding the second plurality of network devices; and randomly identifying, by the computing system, the first plurality of network devices among the second plurality of network devices that are compatible with the one or more network tests, based on the queried information.

* * * * *